United States Patent
De Brito Ninomia

(10) Patent No.: US 11,010,821 B2
(45) Date of Patent: May 18, 2021

(54) RECORDING MEDIUM, MANAGEMENT SERVER, AND LABEL PRODUCING SYSTEM

(71) Applicant: BROTHER KOGYO KABUSHIKI KAISHA, Nagoya (JP)

(72) Inventor: Alisson De Brito Ninomia, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/224,916

(22) Filed: Dec. 19, 2018

(65) Prior Publication Data

US 2019/0236689 A1    Aug. 1, 2019

(30) Foreign Application Priority Data

Feb. 1, 2018    (JP) .............................. JP2018-016302

(51) Int. Cl.
 *G06Q 20/00* (2012.01)
 *G06Q 30/06* (2012.01)
 (Continued)

(52) U.S. Cl.
 CPC ........ *G06Q 30/0641* (2013.01); *B41J 3/4075* (2013.01); *B41J 25/34* (2013.01);
 (Continued)

(58) Field of Classification Search
 CPC ..................... G06Q 30/0641; G06Q 30/0635
 (Continued)

(56) References Cited

U.S. PATENT DOCUMENTS

2001/0038759 A1    11/2001    Kawabe
2002/0077850 A1*   6/2002    McMenimen ..... A61N 1/37211
                                                                 705/2
(Continued)

FOREIGN PATENT DOCUMENTS

JP    2000-101771 A    4/2000
JP    2001-100602 A    4/2001
(Continued)

OTHER PUBLICATIONS

Japanese Notice of Reasons for Refusal dated Dec. 23, 2020 from related JP 2018/016302 together with English language translation.

*Primary Examiner* — Rokib Masud
(74) *Attorney, Agent, or Firm* — Scully, Scott, Murphy & Presser, PC

(57) ABSTRACT

The disclosure discloses a non-transitory computer-readable recording medium storing a consumables management program. In the case that the program is read by a CPU of a management server, the steps are executed. The steps includes a first information acquisition step, a stock detection step, and a display control step. In the first information acquisition step, consumption information related to consumables in each of label producing apparatuses is acquired. In the stock detection step, stock position and stock quantity of the consumables corresponding to the consumption information are detected on the basis of the latest information. In the display control step, a display control signal causing a display device to display the stock position that corresponds to the consumables is outputted.

9 Claims, 14 Drawing Sheets

(51) Int. Cl.
*B41J 3/407* (2006.01)
*B41J 25/34* (2006.01)
*G06F 3/12* (2006.01)
*B41J 29/38* (2006.01)
*G06Q 10/08* (2012.01)

(52) U.S. Cl.
CPC ............ *B41J 29/38* (2013.01); *G06F 3/1204* (2013.01); *G06Q 30/0635* (2013.01); *G06Q 10/087* (2013.01)

(58) Field of Classification Search
USPC .................................................... 705/16, 28
See application file for complete search history.

(56) References Cited

U.S. PATENT DOCUMENTS

| | | | |
|---|---|---|---|
| 2004/0103048 A1* | 5/2004 | Vitulli | G06Q 10/087 705/28 |
| 2009/0033974 A1 | 2/2009 | Nishimi et al. | |
| 2009/0037283 A1* | 2/2009 | Anderson | G06Q 10/087 705/15 |

FOREIGN PATENT DOCUMENTS

| | | | |
|---|---|---|---|
| JP | 2001-134151 A | 5/2001 |
| JP | 2001-251464 A | 9/2001 |
| JP | 2003039795 A | 2/2003 |
| JP | 2009037515 A | 2/2009 |
| JP | 2009066778 A | 4/2009 |
| JP | 2014-228931 A | 12/2014 |
| JP | 2016-192102 A | 11/2016 |
| JP | 2017-142654 A | 8/2017 |

* cited by examiner

[FIG. 1]
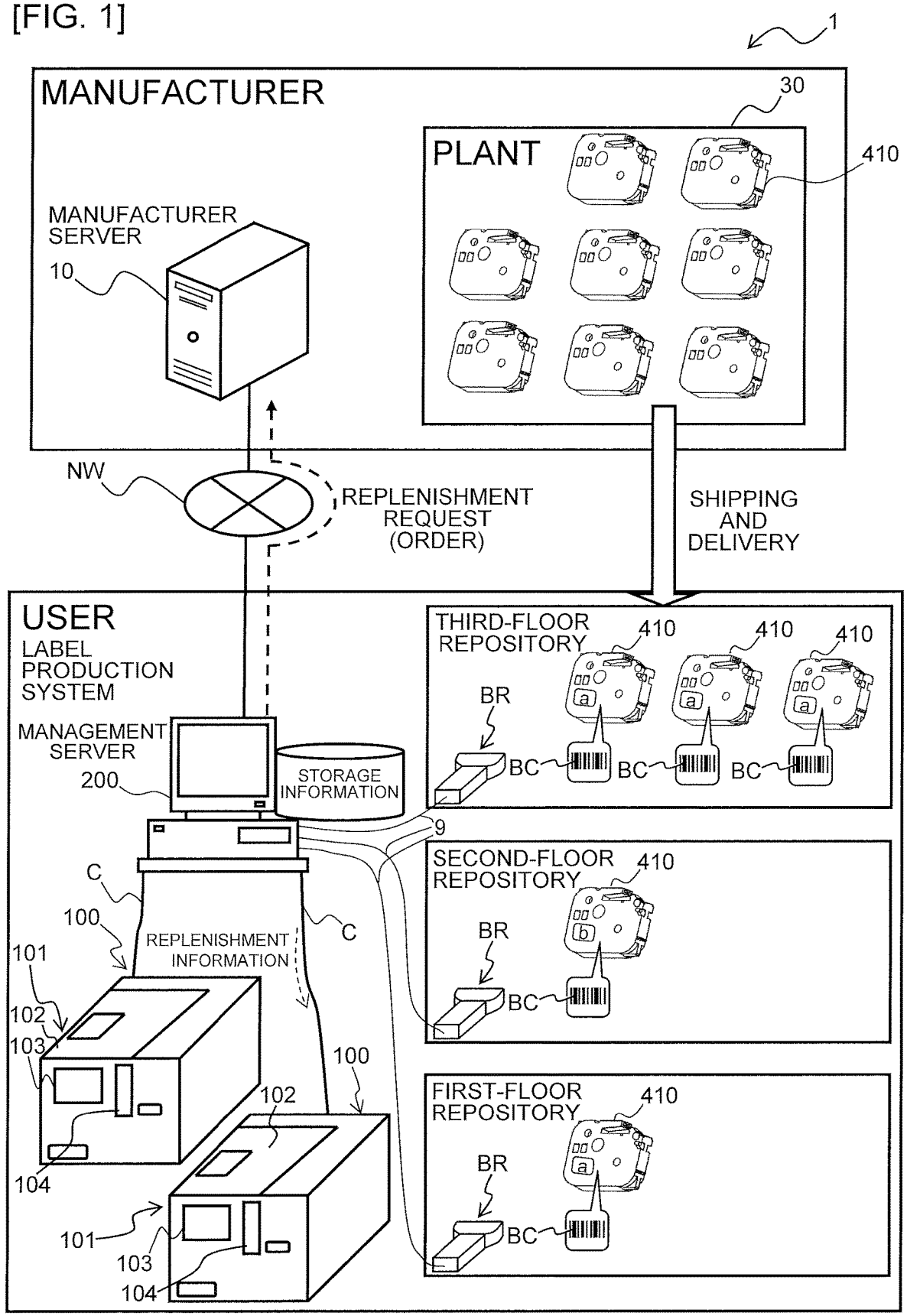

[FIG. 2]
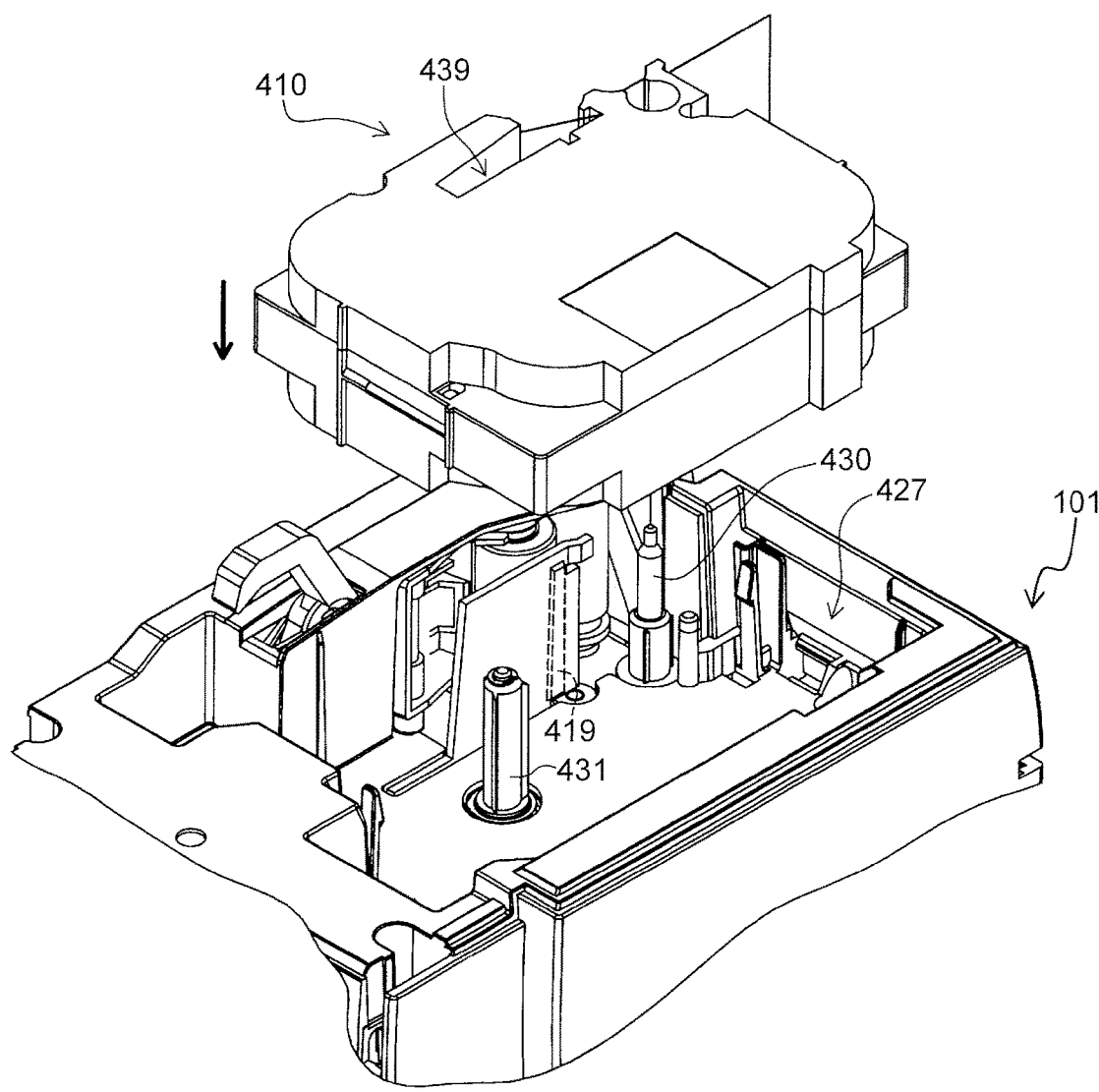

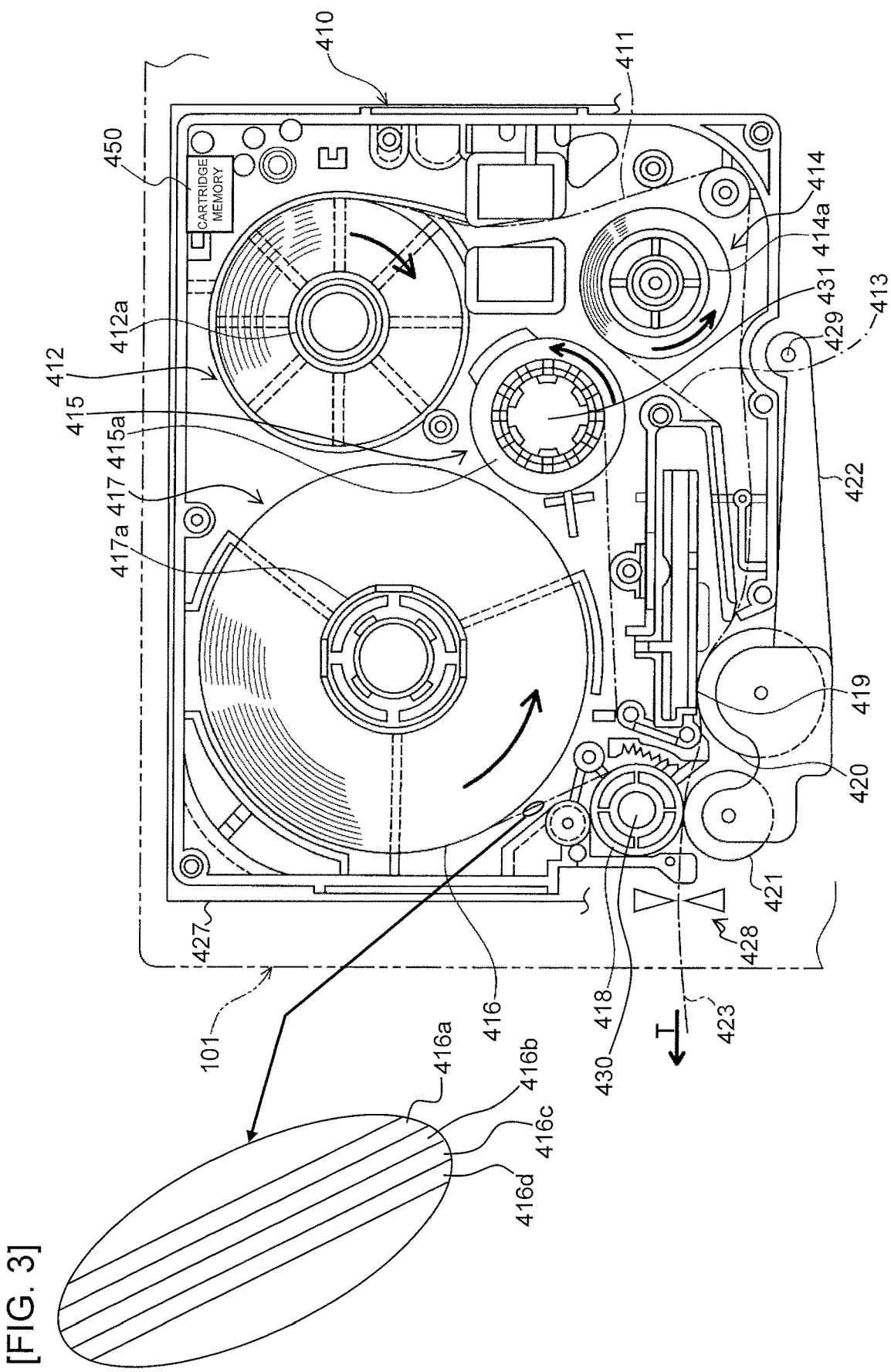
[FIG. 3]

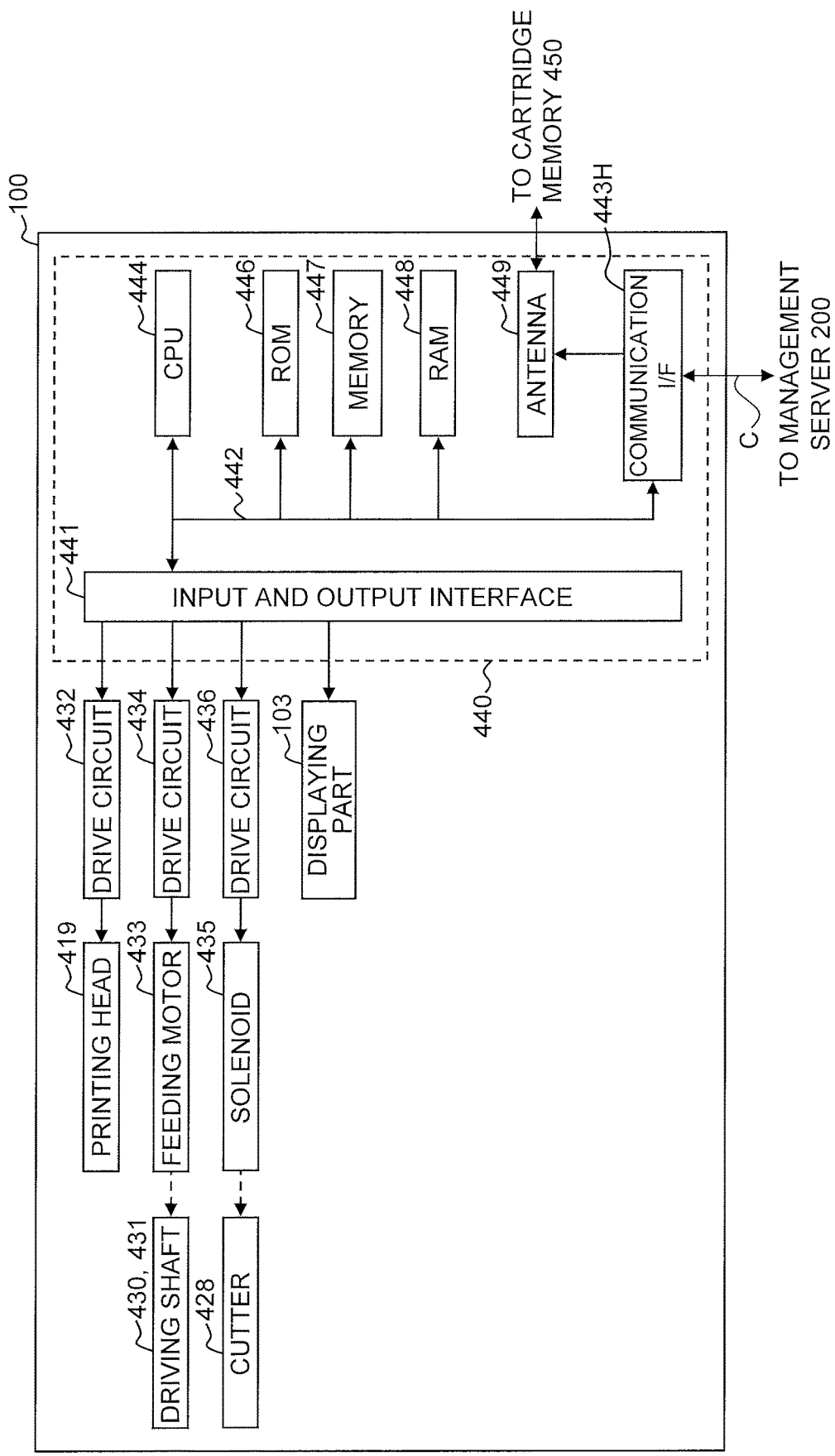

[FIG 5]
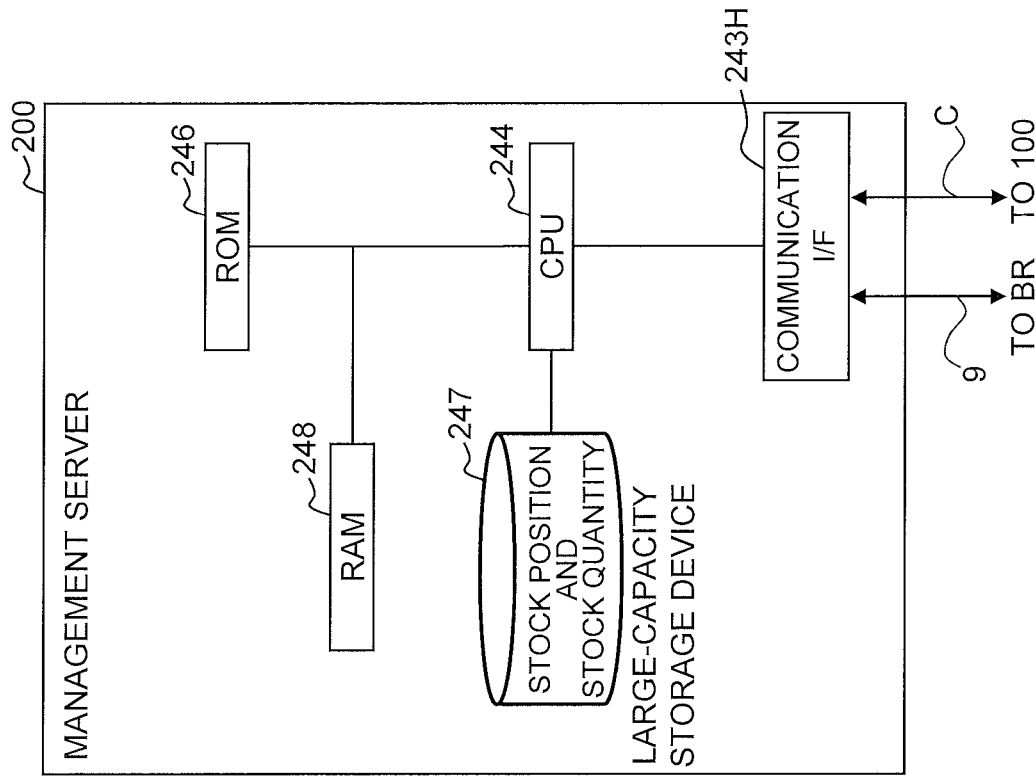

[FIG. 6]
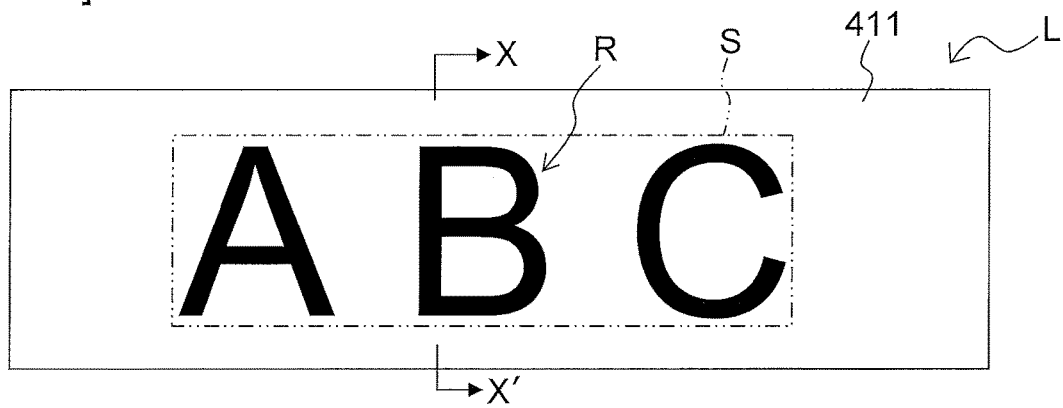
[FIG. 7]
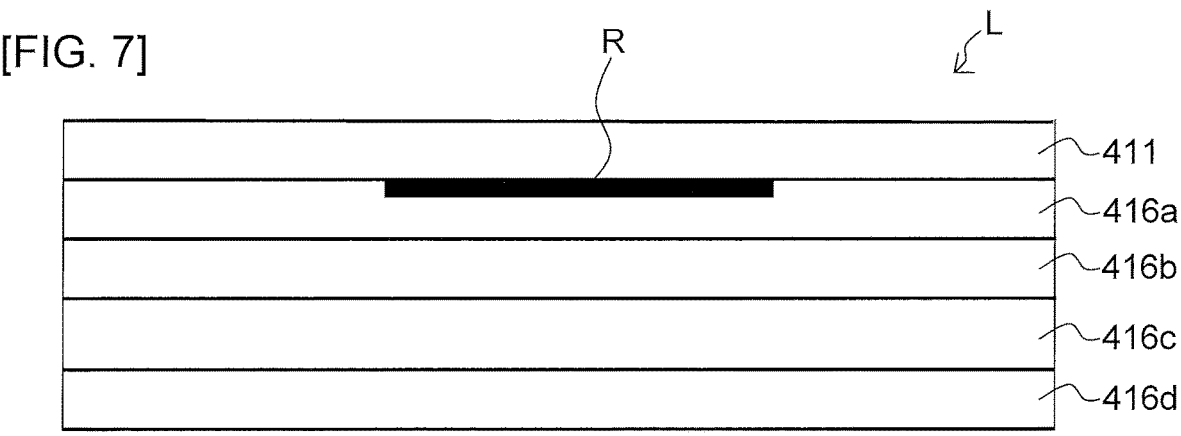
[FIG. 8]
STOCK POSITION AND STOCK QUANTITY INFORMATION
| CARTRIDGE TYPE | STOCK SITE | QUANTITY | FINAL ARRIVAL DATE |
|---|---|---|---|
| TypeA | FIRST FLOOR | 1 | YEAR XX, MONTH YY, DAY XX |
| TypeA | THIRD FLOOR | 3 | YEAR XX, MONTH MM, DAY NN |
| TypeB | SECOND FLOOR | 2 | YEAR XX, MONTH YY, DAY XX |
| -------------- | -------------- | ------- | ------------------------ |
| -------------- | -------------- | ------- | ------------------------ |

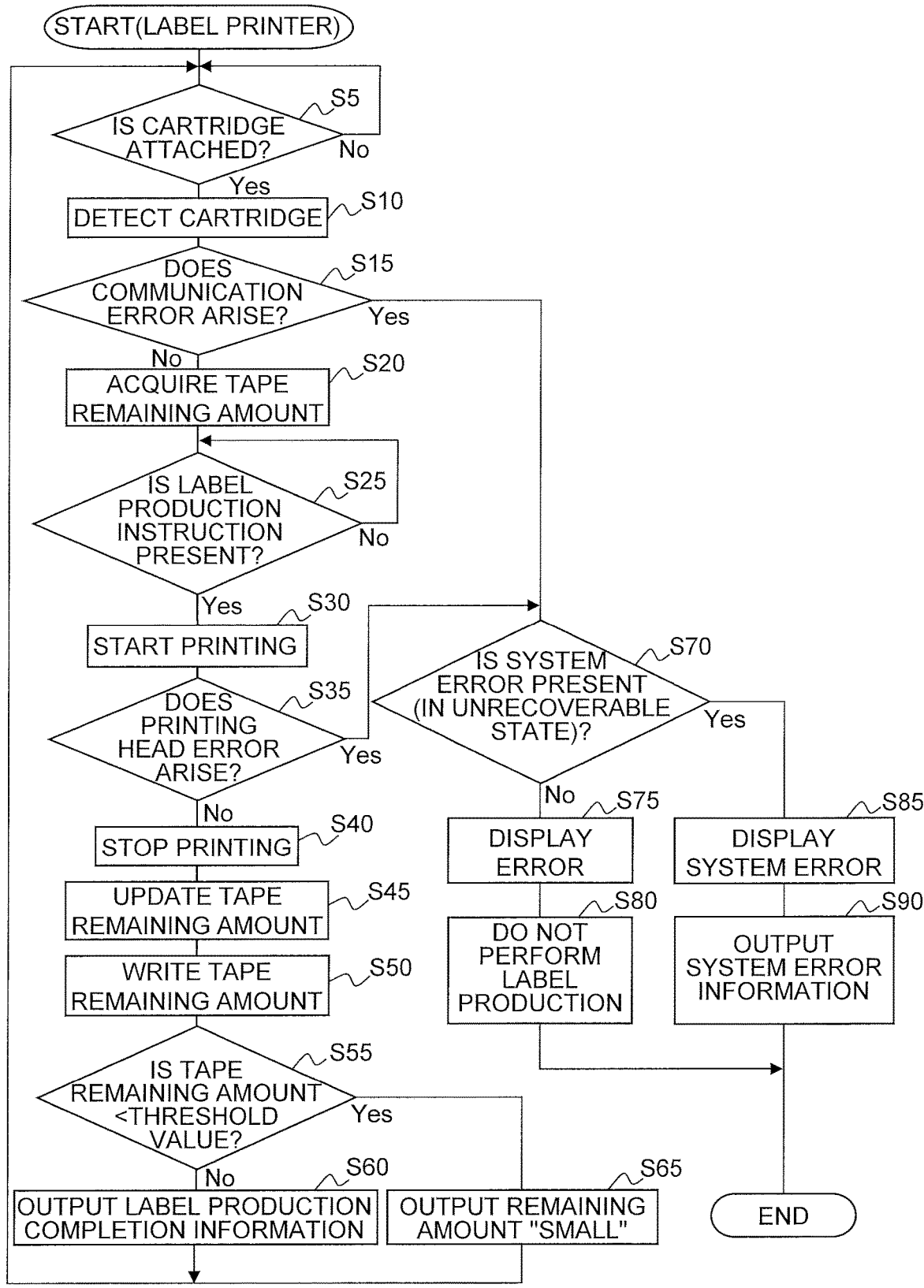
[FIG. 9]

[FIG. 10]
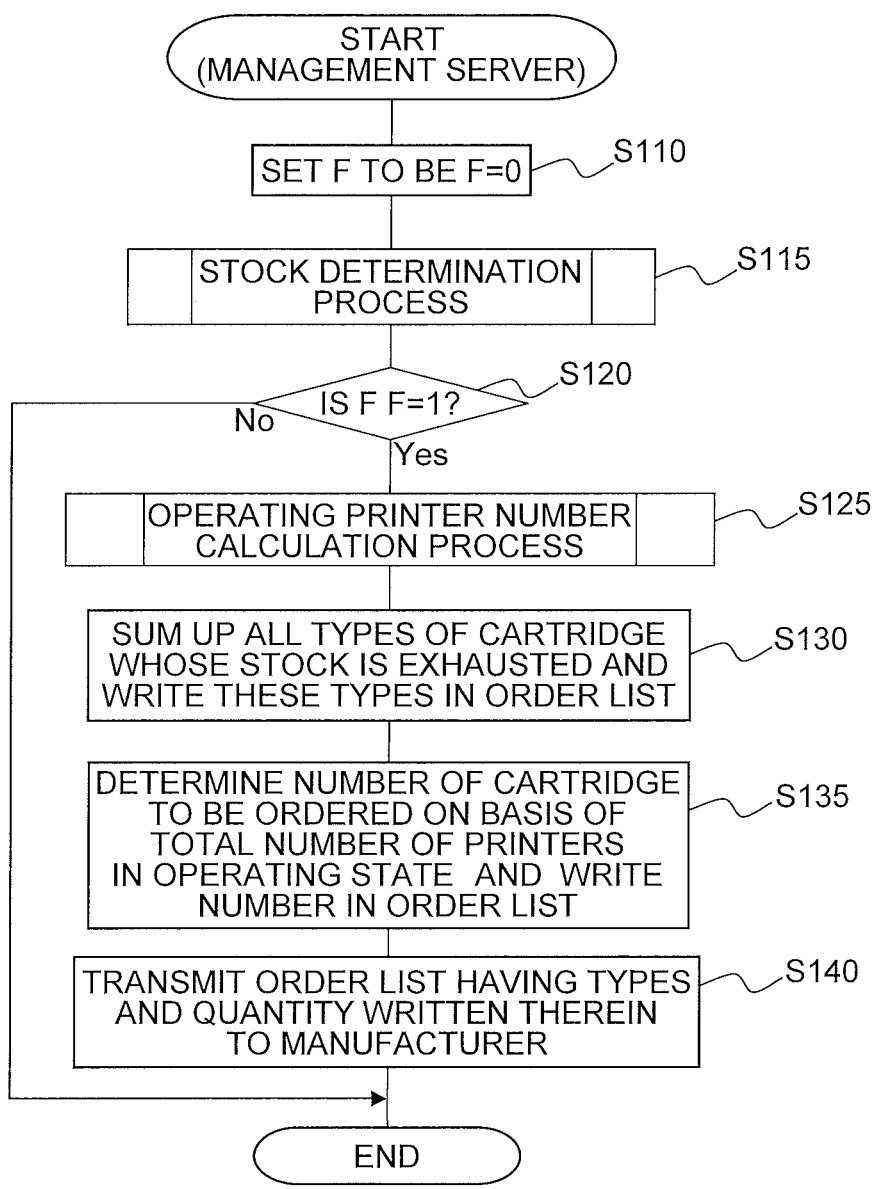

[FIG. 11]
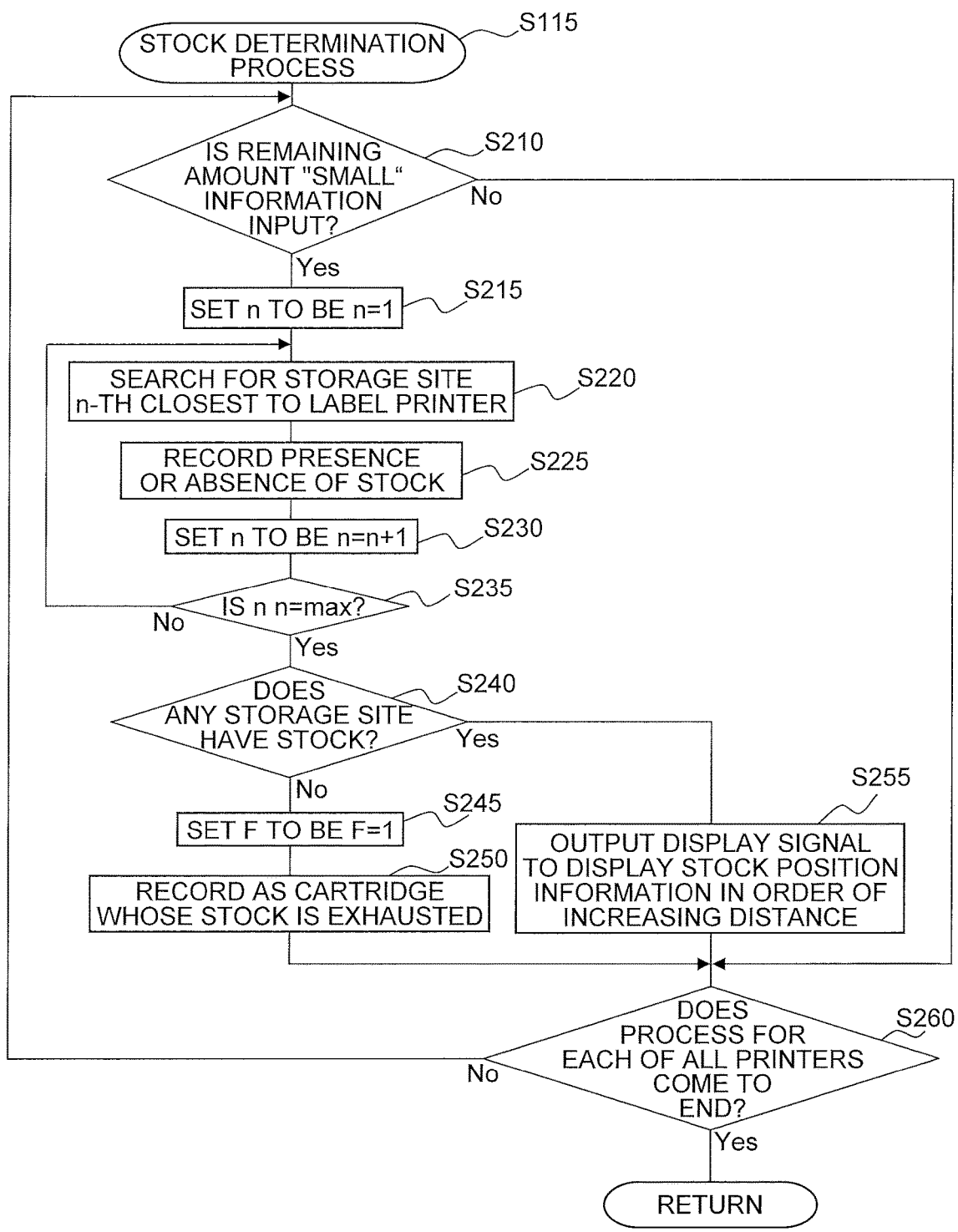

[FIG. 12]
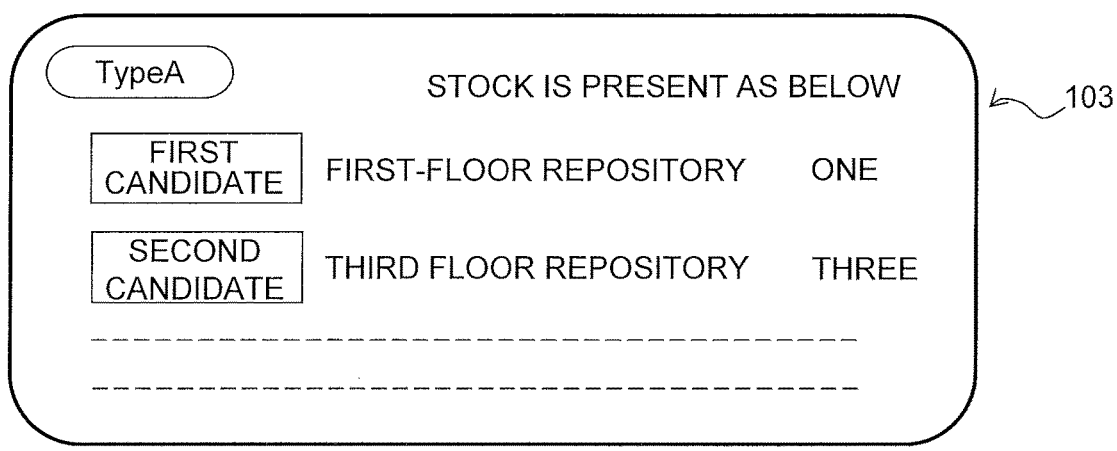

[FIG. 13]
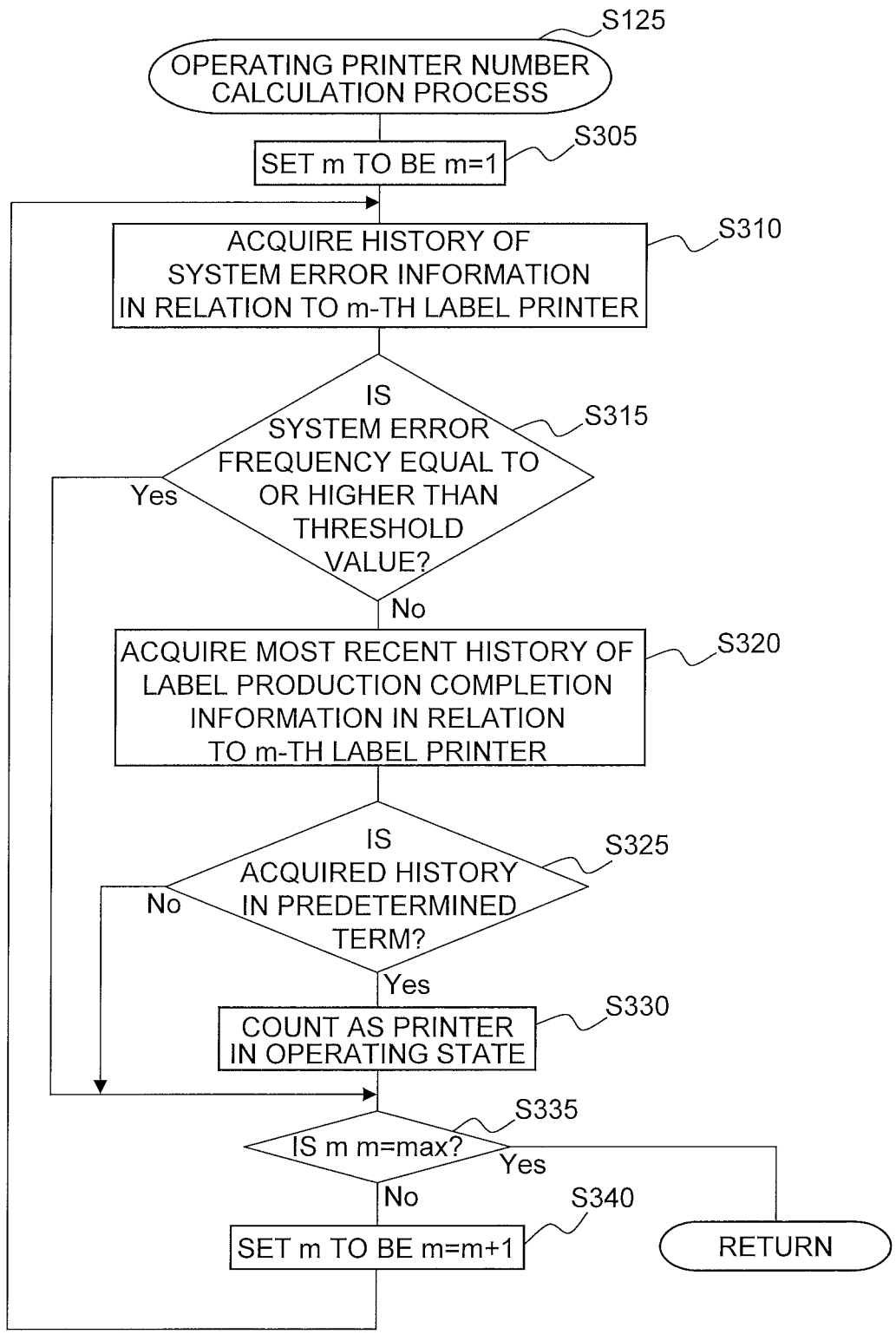

[FIG. 14]

ORDER LIST

| CARTRIDGE TYPE | QUANTITY |
|---|---|
| TypeC | 80 |
| TypeE | 80 |
| ―――――― | ―――― |
| ―――――― | ―――― |

[FIG. 15]
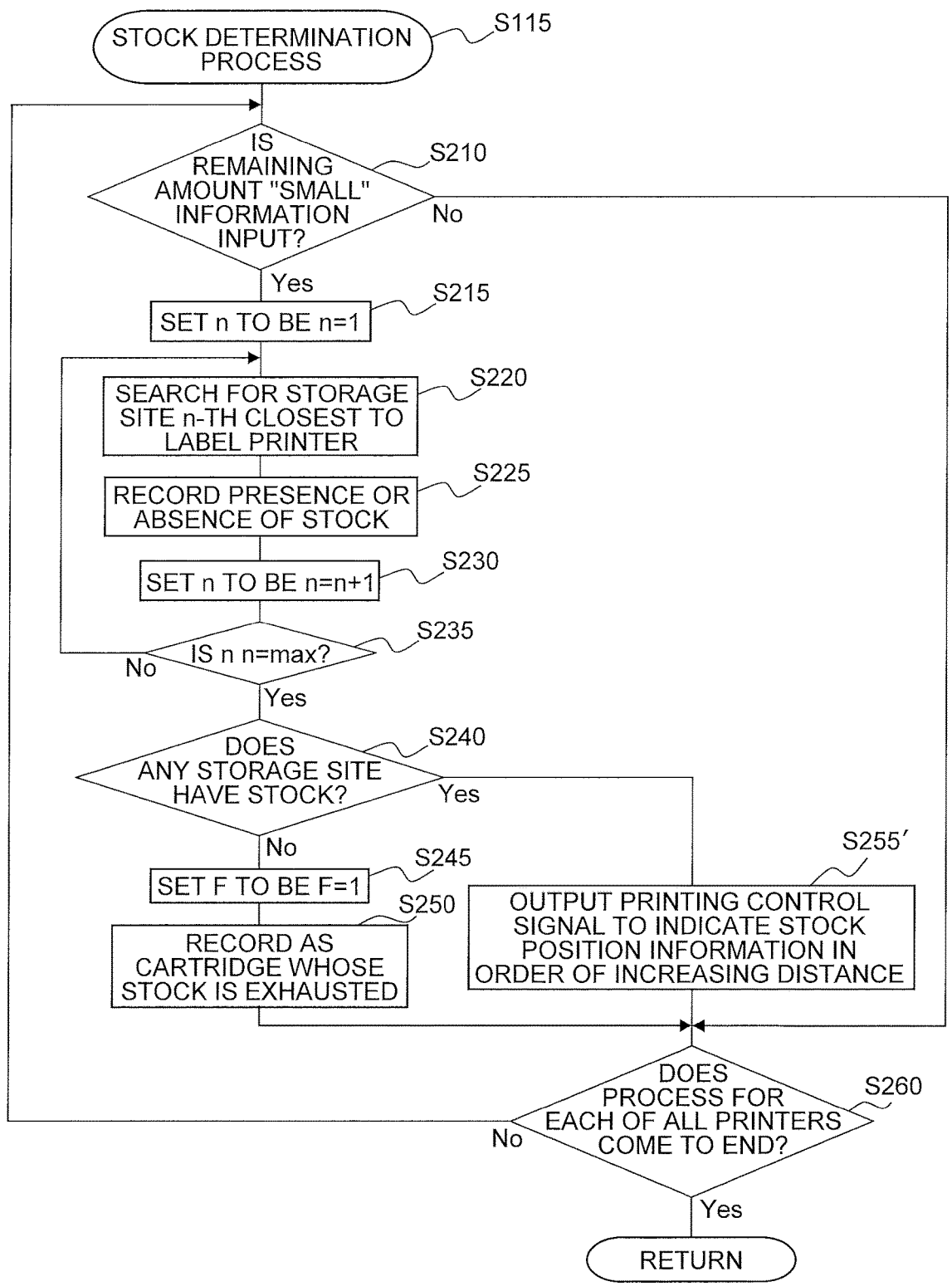

[FIG. 16]
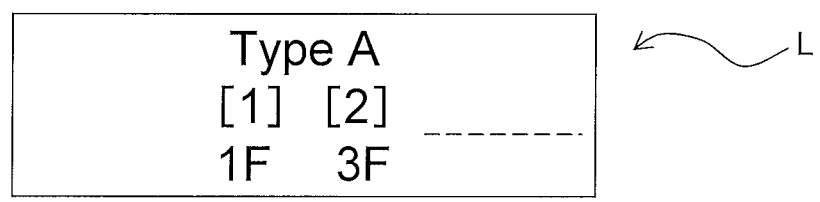

RECORDING MEDIUM, MANAGEMENT SERVER, AND LABEL PRODUCING SYSTEM

CROSS-REFERENCE TO RELATED APPLICATION

The present application claims priority from Japanese Patent Application No. 2008-016302, which was filed on Feb. 1, 2018, the disclosure of which is incorporated herein by reference in its entirety.

BACKGROUND

Field

The present disclosure relates to a recording medium recording therein a consumables management program that manages consumables of a label producing apparatus producing a print label, a management server, and a label producing system that includes the management server.

Description of the Related Art

In each of regular printing devices that include a label producing apparatus and the like, a print is formed on a print-receiving medium and a printed matter such as a print label is formed. When printed matters are formed one after another, the print-receiving medium is gradually consumed and the printable print-receiving medium is finally exhausted. In this case, a new print-receiving medium is attached to the printing device and the formation of the printed matters is continued. In this manner, the print-receiving medium is sequentially consumed by the continuation of the formation of the printed matters (=an example of consumables). A prior art according to which the consumption situation of consumables for a printing device like the above is managed by a management server and the consumables are automatically ordered to the manufacturer thereof is already known.

In the case that consumables are consumed and needs to be replaced with new consumables as described above, the user has to go to a place having the new consumables stored therein to take the new consumables. In the above described prior art, the point that the storage site of the consumables is clearly shown to the user is however not especially taken into consideration as described above. The user therefore needs to look for the above described storage site by him/herself and this requires time and effort.

SUMMARY

An object of the present disclosure is to provide a recording medium, a management server, and a label producing system that, when new consumables are necessary, can clearly show the storage site of the consumables, and the time and effort of the user can be saved and the convenience can be improved.

In order to achieve the above-described object, according to the aspect of the present application, there is provided a non-transitory computer-readable recording medium storing a consumables management program to be readable by a CPU of a management server for executing steps on the CPU, the management server being configured to be connected to a plurality of label producing apparatuses each configured to produce a print label and comprising a memory that stores latest information related to at least one stock position and a stock quantity of consumables for the plurality of label producing apparatuses, the steps comprising a first information acquisition step for acquiring consumption information by the CPU, the consumption information being related to the consumables in each of the label producing apparatuses, from each of the label producing apparatuses, a stock detection step for detecting the stock position and the stock quantity of the consumables by the CPU, the consumables being corresponding to the consumption information acquired in the first information acquisition step, on the basis of the latest information stored in the memory, and a display control step for outputting a display control signal by the CPU, the display control signal causing a display device included in the label producing apparatus from which the consumption information is acquired to display the stock position that corresponds to the consumables for the label producing apparatus, on the basis of a result of a detection in the stock detection step.

In the disclosure of this patent application, print labels are produced by a user using the label producing apparatus. Associated with the sequential formation of the print labels, the consumables in the label producing apparatus (such as, for example, a print-receiving medium to have prints formed thereon and a cartridge roll to have the print-receiving medium accommodated therein) are consumed. Each of the plural label producing apparatuses is connected to a management server. A consumables management program recorded on a recording medium of the disclosure of this patent application is performed on a CPU of the management server and, thereby, at a first information acquisition step, consumption information related to the consumables in the label producing apparatus that is gradually consumed as described above (such as, for example, the fact that the remaining amount thereof reaches zero or that the remaining amount thereof is small) is first acquired.

At this time, in a memory of the management server, the latest information in relation to the storage position and the stock quantity of each of all the consumables is stored in advance. When the consumption information is acquired at the above described first information acquisition step, how many consumables in stock are present and where the consumables in stock are present are detected at a stock detection step on the basis of the above described latest information. On the basis of the result of the detection, at a display control step, a display control signal is output to a display device of the label producing apparatus and, as a result, stock position information indicating where the stock of the consumables is present is thereby displayed on the display device of the label producing apparatus.

As described above, when the amount of consumables becomes small or consumables are exhausted during the use of the label producing apparatus, a user can easily recognize at which position the consumables are stored as a stock, using the display on the display device. As a result, the user can go to the storage position, can reliably acquire the consumables, and can attach the consumables to the label producing apparatus, and the time and effort of the user can therefore be saved and the convenience can be improved.

BRIEF DESCRIPTION OF THE DRAWINGS

FIG. 1 is a view showing an overall schematic configuration of a management system in relation to an embodiment of the present disclosure.

FIG. 2 is a perspective view showing an outer appearance configuration of each of a cartridge holder and a cartridge to be attached thereto inside a label printer.

FIG. 3 is a view showing the peripheral portion of the cartridge holder in the state where the cartridge is attached thereto, together with the cartridge.

FIG. 4 is a functional block view showing the functional configuration of the label printer.

FIG. 5 is a functional block view showing the functional configuration of a management server.

FIG. 6 is a plan view showing an example of an outer appearance of a print label.

FIG. 7 is a view acquired by rotating a transverse cross-sectional view on the basis of a cross-section taken along X-X' in FIG. 6, by 90° in the counterclockwise direction.

FIG. 8 is an explanatory table showing an example of stock position/stock quantity information stored in the management server.

FIG. 9 is a flowchart showing control steps performed by a CPU of the label printer.

FIG. 10 is a flowchart showing control steps performed by a CPU of the management server.

FIG. 11 is a flowchart showing detailed steps of step S115 in FIG. 10.

FIG. 12 is an explanatory view showing an example of a display of stock position information on a displaying part of the label printer.

FIG. 13 is a flowchart showing detailed steps of step S125 in FIG. 10.

FIG. 14 is an explanatory table showing an example of an order list.

FIG. 15 is a flowchart showing detailed steps of a stock determination process at step S115 of the control steps performed by the CPU of the management server in a modification example where a stock position of a cartridge is printed using a label.

FIG. 16 is a view showing an example of a produced print label.

DETAILED DESCRIPTION OF THE PREFERRED EMBODIMENTS

An embodiment of the present disclosure will be described below with reference to the drawings.

<Overview of Configuration of System>

FIG. 1 is a view showing an overall schematic configuration of a management system that includes a management server in relation to this embodiment.

In FIG. 1, a management system 1 includes a manufacturer server 10 owned by a supplier, plural label printers 100 (for which two label printers 100 are exemplified in FIG. 1) owned by a user, and a management server 200 connected to the label printers 100 each by a cable C. The manufacturer server 10 and the management server 200 are connected to each other to be able to mutually transmit and receive information therebetween through a network NW such as, for example, a communication network.

In this example, the manufacturer server 10 is disposed being attached to a plant 30 of a manufacturer manufacturing cartridges 410 described later. Not limiting to the plant 30, the manufacturer server 10 may be disposed being attached to a warehouse having the cartridges 410 stored therein, or the like. Not limiting to the manufacturer, the manufacturer server 10 may be disposed in a premise of a sales outlet, a dealer, or the like that sells the cartridges 410. No problems therefore arises only when the manufacturer server 10 is disposed in a premise of an equipment that can ship the cartridges 410 of the type and the quantity in accordance with the content of an order (see FIG. 14 described later) from the management server 200 described later on the basis of this order. Otherwise, not limiting to disposing on the premise of the equipment, the manufacturer server 10 may be disposed in a premise other than that of the equipment, in the state where the manufacturer server 10 can acquire the situation of the equipment and can instruct shipping, as necessary.

The management server 200 connected to the plural label printers 100 has a function with which the management server 200 can access the manufacturer server 10 through the network NW and can transmit and receive various types of information thereto/therefrom. The management server 200 has bar code readers BR connected thereto each through a USB cable 9.

The bar code readers BR is disposed in each of plural storage sites (in this example, a repository disposed on each of plural floors such as the first floor, the second floor, and the third floor, and will hereinafter be simply referred to as "first-floor repository", "second-floor repository", "third-floor repository", or the like) for the plural cartridges 410 usable in the label printer 100, and optically reads information from a bar code BC of each of the cartridges 410 on the basis of an operation of the operator. The information read by the bar code reader BR (such as a cartridge ID that is identification information of each of the cartridges 410, type information indicating the type of the cartridge 410, and the like) is transmitted to the management server 200 through the USB cable 9. On the basis of the transmitted results, the management server 200 stores the latest stock position and the latest stock quantity (hereinafter, collectively referred to as "storage information" as necessary) of the cartridge 410 for each of the cartridges 410, into a large-capacity storage device 247 (described later).

The label printer 100 includes a housing 101, and an opening and closing lid 102 that is disposed to be able to be opened or closed (or may be disposed to be attached and detached) is disposed on an upper face portion of the housing 101. A displaying part 103 and a tape discharging exit 104 are disposed on a front face portion of the housing 101. The displaying part 103 can display the stock position/stock quantity information of the cartridges 410, that is updated and stored in the management server 200 as necessary (the details thereof will be described later). The tape discharging exit 104 is an exit to discharge a label tape with print 423 (see FIG. 3 described later) produced in the housing 101 to the exterior of the housing 101.

FIG. 2 is a perspective view showing an outer appearance configuration of each of a cartridge holder 427 and the cartridge 410 to be attached thereto inside the housing 101 in the state where the above described opening and closing lid 102 of the label printer 100 is opened. In FIG. 2, to avoid complication of showing, the above describing opening and closing lid 102 opened upward is not shown. FIG. 3 is a view showing the peripheral portion of the cartridge holder 427 in the state where the cartridge 410 is attached thereto, together with the cartridge 410.

In FIG. 2 and FIG. 3, the cartridge holder 427 to attach and detach thereto/therefrom the cartridge 410, a printing head 419, a feeding roller driving shaft 430, and a ribbon take-up roller driving shaft 431 are disposed inside the housing 101 of the label printer 100. In this example, the cartridge 410 is a box body whose overall body is formed in a substantially rectangular parallelepiped shape. On a proper point of the cartridge 410 (in this example, a corner portion), a cartridge memory 450 with which communication is performed by an antenna 449 described later of the label printer 100 is disposed. In a portion of the cartridge 410, a head insertion passage opening 439 that penetrates both of the front and the back faces is formed.

The cartridge 410 includes a base tape roll 417 having a base tape 416 wound therein, a cover film roll 412 having a cover film 411 to be a print-receiving medium wound therein, a ribbon supply side roll 414 that feeds out an ink ribbon 413 for printing (not necessary when the print-receiving medium is a thermal tape), a ribbon take-up roller 415 that takes up the ink ribbon after the printing, and a feeding roller 418.

The base tape roll 417 has the above described base tape 416 wound around a base tape spool 417*a*.

The base tape 416 has a layered structure of plural layers (four layers in this example) (see a partial enlarged view in FIG. 3). The base tape 416 includes an adhesive layer 416*a* including a proper adhesive and to bond the above described cover film 411 thereto, a tape base layer 416*b* including, for example, polyethylene terephthalate (PET) or the like, an adhesive layer 416*c* including a proper adhesive, and a separation sheet 416*d*, that are stacked on each other in this order from the side wound on the inner side (on the right in the partial enlarged view) toward the side opposite thereto (on the left in the partial enlarged view).

The separation sheet 416*d* is a sheet that is used when a finally completed print label L (see FIGS. 6, 7, and the like described later) is affixed to an target object for affixing such as a desired article, and that enables the affixing to the target object for affixing using the adhesive layer 416*c* by being peeled off.

The cover film roll 412 has the cover film 411 having, in this example, a substantially equal width as that of the above described base tape 416 wound around a cover film spool 412*a*.

The ribbon supply side roll 414 has the above described ink ribbon 413 wound around a ribbon supply side spool 414*a*.

The ribbon take-up roller 415 includes a ribbon take-up spool 415*a*, and takes up the ink ribbon 413 after the printing (after its use) and winds the ink ribbon 413 on a ribbon take-up spool 415*a* by being driven by the above described ribbon take-up roller driving shaft 431 on the side of the cartridge holder 427.

The feeding roller 418 is driven by the above described feeding roller driving shaft 430 on the side of the cartridge holder 427, thereby presses the above described base tape 416 and the above described cover film 411 to adhere the base tape 416 and the cover film 411 to each other to form the label tape with print 423, and concurrently performs tape feeding in the direction indicated by an arrow in FIG. 3.

A driving force of a feeding motor 433 (see FIG. 4 described later) that is, for example, a pulse motor disposed outside the cartridge 410 is transmitted to each of the above described ribbon take-up roller driving shaft 431 and the feeding roller driving shaft 430 through a gear mechanism not shown, and the above described ribbon take-up roller 415 and the feeding roller 418 are thereby rotated and driven interlocking with these shafts.

On the other hand, the cartridge holder 427 includes the above described printing head 419, the above described ribbon take-up roller driving shaft 431, the above described feeding roller driving shaft 430, and a roller holder 422.

The printing head 419 includes a large number of heating elements, and performs print formation for the cover film 411 that is fed out and transported from the above described cover film roll 412.

The feeding roller driving shaft 430 feeds the above described cover film 411 fed out (supplied) from the cover film roll 412 of the cartridge 410 attached to the cartridge holder 427 and the above described base tape 416 fed out from the base tape roll 417 by driving the above described feeding roller 418.

The roller holder 422 is pivotally supported rotatably by a support shaft 429 and is adapted for the position thereof to be switchable between a printing position and a release position by a switching mechanism. This roller holder 422 has a platen roller 420 and a tape pressure contact roller 421 rotatably arranged therein, and the platen roller 420 and the tape pressure contact roller 421 are adapted to be pressed to the printing head 419 and the feeding roller 418 when the position of the roller holder 422 is switched to the above described printing position.

The cartridge holder 427 has a cutter 428 arranged therein to be adjacent to a discharging exit not shown of the cartridge 410. A solenoid 435 (see FIG. 4 described later) is excited, and this cutter 428 is thereby actuated and totally cuts the label tape with print 423 in its thickness direction to produce the print label L described later (see FIGS. 6 and 7 described later).

In the above configuration, after the cartridge 410 is attached to the cartridge holder 427, the ribbon take-up roller driving shaft 431 and the feeding roller driving shaft 430 are rotated and driven being synchronized with each other, by the driving force of the feeding motor 433 (see FIG. 4 described later). Associated with the driving of the feeding roller driving shaft 430, the feeding roller 418, the platen roller 420, and the tape pressure contact roller 421 are rotated, and the base tape 416 is fed out from the base tape roll 417 and is supplied to the feeding roller 418 as described above. On the other hand, the cover film 411 is fed out from the cover film roll 412 and the plural heating elements of the printing head 419 are energized by a printing head drive circuit 432 (see FIG. 4 described later). At this time, the ink ribbon 413 is pressed to the above described printing head 419 and is thereby brought into contact with the back face of the cover film 411. As a result, a desired print (a mirror image print) is printed in a desired print area on the back face of the cover film 411. The base tape 416 and the cover film 411 whose printing comes to an end are bonded to each other to be integrated with each other by the feeding roller 418 and the tape pressure contact roller 421, to be formed as the label tape with print 423, and are transported to the exterior of the cartridge 410. The label tape with print 423 is cut by the cutter 428 and the print label L with the desired print formed thereon is produced.

FIG. 4 is a functional block view showing the functional configuration of the label printer 100.

In FIG. 4, a control circuit 440 is arranged on a control substrate not shown of the label printer 100. The control circuit 440 has a CPU 444 disposed therein, and an input/output interface 441, a ROM 446, a memory 447, a RAM 448, and a communication interface 443H are connected to this CPU 444 through a data bus 442.

The ROM 446 stores therein various types of program necessary for control (including a printing process program that performs control steps shown in FIG. 9 described later). The CPU 444 performs various types of computation on the basis of these various types of program stored in the ROM 446. The RAM 448 temporarily stores therein the results of the various types of computation computed by the CPU 444, and the like.

A printing head drive circuit 432 to drive the above described printing head 419, a feeding motor drive circuit 434, a solenoid drive circuit 436 that drives the above described solenoid 435, and the displaying part 103 are connected to the input/output interface 441.

The feeding motor drive circuit 434 drives the feeding motor 433 and thereby drives the feeding roller driving shaft 430 and the ribbon take-up roller driving shaft 431 to convey the base tape 416, the cover film 411, and the label tape with print 423.

The solenoid drive circuit 436 excites the solenoid 435 that drives the cutter 428 to perform a cutting operation.

The antenna 449 is connected to the communication interface 443H. This antenna 449 is configured to be communicable with the above described cartridge memory 450 in the state where the cartridge 410 is attached to the cartridge holder 427. The label printer 100 is communicable with the management server 200 through this communication interface 443H.

FIG. 5 is a functional block view showing the functional configuration of the management server 200.

In FIG. 5, the management server 200 has a CPU 244 disposed therein, and a ROM 246, a RAM 248, a large-capacity storage device 247, and a communication interface 243H are connected to this CPU 244.

The ROM 246 stores therein various types of program necessary for control (including a consumables management program that performs control steps shown in FIGS. 10, 11, 13, and 15 described later). The CPU 244 performs various types of computation on the basis of these various types of program stored in the ROM 246. The RAM 248 temporarily stores therein the results of the various types of computation computed by the CPU 244 (such as consumption information in relation to the consumables described later, and the stock position, the stock quantity, and the like of the consumables).

The large-capacity storage device 247 stores therein the latest information in relation to the stock positions and the stock quantities of the cartridges 410 for each of the plural label printers 100 that each produce the print label L, to be updatable as necessary (the details thereof will be described later).

The communication interface 243H is connected for communication to each of the plural label printers 100 by the cable C, and is connected to the above described bar code reader BR installed in each of the above described plural storage sites, through the above described USB cable 9. The communication interface 243H transmits a replenishment order for the consumables from the management server 200 to the manufacturer server 10 (ordering) through the network NW.

<Example of Print Label>

An example of the above described print label L formed by the label printer 100 as described above after completion of the cutting of the label tape with print 423 will be described with reference to FIGS. 6 and 7. In FIGS. 6 and 7, the print label L has a five-layer structure formed by adding the cover film 411 to the four-layer structure shown in FIG. 3 as described above. The five layers therefore include the above described cover film 411, the above described adhesive layer 416a, the above described tape base layer 416b, the above described adhesive layer 416c, and the above described separation sheet 416d, from the side of the cover film 411 (on the upper side in FIG. 7) toward the side opposite thereto (on the lower side in FIG. 7). In this example, as shown in FIG. 6, in the print area S included in the cover film 411 (specifically, on the back face thereof), the desired print R (in this example, characters "ABC") is printed.

<Essential Part of this Embodiment>

As described above, the cartridge 410 is attached to the label printer 100, the above described base tape 416 and the cover film 411 supplied from the cartridge 410 are fed, the above described print R is formed on the fed cover film 411, and the print label L is thereby formed. When the print labels L are formed one after another each in this manner, the cover film 411 (together with the base tape 416) is gradually consumed. Though not shown and not described in detail in the above, in the above described label printer 100, the remaining amount (that may be a use amount, and the same will hereinafter be applied) of the cover film 411 in the cartridge 410 due to the above described consumption is detected by a known proper remaining amount detection mechanism (a mechanism that performs, for example, detection and accumulation of the feeding amount of the above described cover film 411, detection of variation of the outer diameter dimension of the cover film rill 412 or the like, or detection of variation of the rotation number of the cover film roll 412). As a result of the above described consumption, the printable cover film 411 in the cartridge 410 finally is exhausted. In this case, a new cartridge 410 of the same type stocked in the above described storage site is attached to the cartridge holder 427 and the formation of the print labels L is continued. In this manner, the cartridges 410 of the type are sequentially consumed by the continuation of the formation of the print labels L.

In the case that the cartridge 410 is completely consumed and needs to be replaced with the new cartridge 410 in this manner, the user has to go to the place having the new cartridge 410 stored therein to take the new cartridge 410. The user in this state however cannot recognize (learn) which place the place having the cartridge 410 stored therein as the stock is (in the example of FIG. 1, which repository of those on the first floor, the second floor, and the third floor the place is), and therefore needs to look for the storage site by him/herself, and this requires time and effort.

In this embodiment, the above described large-capacity storage device 247 of the management server 200 connected to each of the plural label printers 100 stores therein the above described latest storage information to be updatable as necessary (the stock positions and the stock quantities) of the cartridges 410 for the above described plural label printers 100.

For example, in the example of the above described storage information shown in FIG. 8, one cartridge 410 of a "type A" is stored in the above described first-floor repository (that is, the stock, and the same will hereinafter be applied), the final arrival date thereof is "year XX, month YY, day XX". Three cartridges 410 of this "type A" are also stored in the above described third-floor repository and the final arrival date thereof is "year XX, month MM, day NN". Two cartridges 410 of a "type B" are also stored in the above described second-floor repository and the final arrival date thereof is "year XX, month YY, day XX" (thereafter, not shown). In this manner, the storage information stored in the large-capacity storage device 247 is updated as necessary corresponding to the transmitted result from the above described bar code readers BR.

In the case that the replacement of the cartridge 410 is necessary for the label printer 100 as described above, the above described storage site having the corresponding new cartridge 410 stored therein is displayed on the label printer 100 on the basis of the above described storage information. The control steps performed for the above by the CPU 444 of the above described label printer 100 and the CPU 244 of the above described management server 200 in coordination with each other will be described with reference to flow-charts of FIG. 9 to FIG. 11.

<Control Flow on Label Printer Side>

The control steps performed by the CPU 444 of the label printer 100 when the print label L is formed are shown in FIG. 9.

In FIG. 9, at step S5, the CPU 444 first determines whether or not the cartridge 400 is attached to the above described cartridge holder 427, using a known proper method. The determination is not satisfied until the cartridge 410 is attached to the cartridge holder 427 (S5:NO) and the CPU 444 stands by in a loop. When the cartridge 410 is attached, the determination is satisfied (S5:YES) and the CPU 444 moves to step S10.

At step S10, the CPU 444 performs detection of the cartridge 410 attached to the cartridge holder 427 (facilitates cartridge detection) using communication of the above described cartridge memory 450 of the cartridge 410 using the above described antenna 449 (reception of information from the cartridge memory 450). For this detection, the CPU 444 also receives the type information in relation to the above described cartridge 410 (fixedly stored in advance) and information in relation to the tape remaining amount in the cartridge 410 (whose initial value corresponds to the total length of the tape effective length and that is subsequently written every time step S50 described later is performed) from the above described cartridge memory 450 together with the above.

At step S15, the CPU 444 determines whether or not any communication error arises between the above described antenna 449 and the above described cartridge memory 450 (that is, any cartridge detection cannot be completed) in the cartridge detection performed at step S10. In the case that no communication error arises, the determination at step S15 is not satisfied (S15:NO) and the CPU 444 moves to step S20.

At step S20, the CPU 444 acquires the remaining amount of the above described cover film 411 in the above described cartridge 410 (hereinafter, properly referred to simply as "tape remaining amount") on the basis of the received result from the above described cartridge memory 450 at the above described step S10. The CPU 444 subsequently moves to step S25.

At step S25, the CPU 444 determines whether or not any label production instruction (a print instruction) by the user is issued through, for example, a proper operation means disposed on the label printer 100. The determination is not satisfied until the label production instruction is issued (S25:NO) and the CPU 444 stands by in a loop. When the label production instruction is issued, the determination is satisfied (S25:YES) and the CPU 444 moves to step S30.

At step S30, the CPU 444 outputs a control signal to the above described drive circuit 434 to perform the feeding of the above described cover film 411 and the base tape 416 using the feeding roller driving shaft 430 and the ribbon take-up roller driving shaft 431 and concurrently outputs a control signal to the above described drive circuit 432 to start the formation of the desired print R onto the cover film 411 using the printing head 419 (in other words, the production of the label tape with print 423).

At step S 35, the CPU 444 subsequently determines whether or not any operation error (such as, for example, overheating or incomplete heating of the heating elements) arises in the printing head 419 already starting the formation of the print at the above described step S30, using a known method. In the case that any operation error arises, the determination at step S35 is satisfied (S35:YES) and the CPU 444 moves to step S70 described later. In the case that no operation error arises, the determination at step S35 is not satisfied (S35:NO) and the CPU 444 moves to step S40.

At step S40, the CPU 444 outputs a control signal to the above described drive circuit 432 to cause the printing by the printing head 419 to come to an end. At this time, the CPU 444 outputs a control signal to the above described drive circuit 434 to also stop the feeding of the above described cover film 411 and the base tape 416 using the feeding roller driving shaft 430 and the ribbon take-up roller driving shaft 431. At this time, the CPU 444 outputs a control signal to the above described drive circuit 436 to drive the above described cutter 428 using the above described solenoid 435 to cut the label tape with print 423 to produce the print label L.

At step S45, the CPU 444 subsequently updates the above described tape remaining amount acquired at the above described step S20 using a reduction amount of the tape remaining amount (or this may be an increase amount of the tape use amount) between the above described step S30 and step S40 detected by the above described remaining amount detection mechanism. The CPU 444 subsequently moves to step S50.

At step S50, the CPU 444 updates by overwriting by writing the tape remaining amount in the above described cartridge 410 updated at the above described step S45 into the above described cartridge memory 450 using the communication using the above described antenna 449. The CPU 444 subsequently moves to step S555.

At step S55, the CPU 444 determines whether or not the tape remaining amount updated at the above described step S45 (that is, the latest tape remaining amount) is smaller than a predetermined threshold value determined in advance. This threshold value is set to be, for example, a length (such as, for example, several cm to several 10 cm) for which it cannot be stated that this length is sufficient to reliably perform the formation of one regular print label L.

In the case that the above described tape remaining amount is equal to or larger than the above described threshold value, the determination at step S55 is not satisfied (S55:NO) and the CPU 444 moves to step S60. At step S60, the CPU 444 outputs a predetermined "label production completion information" that indicates that the production of the print label L is completed without any problem and the tape remaining amount in the cartridge 410 is sufficient, to the management server 200. This output "label production completion information" is stored in the above described large-capacity storage device 247 of the management server 200 in the form of information correlated with the identification information of the label printer 100 (as, for example, a log). The CPU 444 subsequently returns to step S5 and repeats the above described same steps.

On the other hand, in the case that the above described tape remaining amount is smaller than the above described threshold value, the determination at step S55 is satisfied (S55:YES) and the CPU 444 moves to step S65. At step S65, the CPU 444 outputs predetermined "remaining amount small information" indicating that the tape remaining amount is small, to the management server 200 (see step S210 in FIG. 11 described later). The CPU 444 may output "remaining amount exhausted information" indicating that the tape remaining amount is exhausted to the management server 200, by setting the threshold value to be close to zero at the above described S55. This output "remaining amount small information" and the like are stored in the above described large-capacity storage device 247 of the management server 200 in the form of information correlated with the identification information of the label printer 100 (as, for example, a log). The CPU 444 subsequently returns to step S5 and repeats the above described same steps.

On the other hand, in the case that the CPU 444 determines that a communication error arises at step S15, the determination is satisfied (S15:YES) and the CPU 444 moves to step S70 (the same is applied in the case that the determination at step S35 is satisfied). At step S70, the CPU 444 determines whether or not the label printer 100 itself is in an unrecoverable error (a system error) state, using a known method. Examples of this system error include at least one of operation malfunctioning due to the above descried printing head 419 and communication malfunctioning with the above described cartridge memory 450 due to the above described antenna 49.

In the case that the CPU 444 determines that no system error state is present at step S70, the determination at step S70 is not satisfied (S70:NO) and the CPU 444 moves to step S75.

At step S75, the CPU 444 outputs a control signal to the displaying part 103 of the label printer 100 to perform proper displaying of the error. At step S80, the CPU 444 subsequently does not issue any label production instruction (in the case that the label production instruction is received at step S25, this instruction is handled to be canceled) and causes this flow to come to an end.

On the other hand, in the case that the CPU 444 determines that a system error state is present at step S70, the determination is satisfied (S70:YES) and the CPU 444 moves to step S85. At step S85, the CPU 444 outputs a control signal to the displaying part 103 of the label printer 100 to perform proper displaying of the system error. At step S90, the CPU 444 subsequently outputs "system error information" indicating occurrence of the above described system error, to the management server 200 (see also step S310 in FIG. 13 described later). This output "system error information" is stored in the above described large-capacity storage device 247 of the management server 200 in the form of information correlated with the identification information of the label printer 100 (as, for example, a log). The CPU 444 subsequently causes this flow to come to an end.

<Control Flow on Management Server Side>

Control steps performed by the CPU 244 of the management server 200 corresponding to the above will be shown in FIG. 10.

In FIG. 10, at step S110, the CPU 244 first initializes a flag F representing exhaustion of the stock of the cartridge 410, to be "0". The CPU 244 subsequently moves to step S115.

At step S115, the CPU 244 performs a stock determination process (whose details will be described later) on the basis of the above described latest storage information stored in the large-capacity storage device 247.

The detailed steps of the above described step S115 are shown in FIG. 11. In FIG. 11, at step S210, the CPU 244 first determines whether or not the above described "remaining amount small information" output from the label printer 100 at the above described step S65 is input. In the case that the "remaining amount small information" is not input, the determination at step S210 is not satisfied (S210:NO) and the CPU 244 moves to step S260 described later. In the case that the "remaining amount small information" is input, the determination at step S210 is satisfied (S210:YES) and the CPU 244 moves to step S215.

At step S215, the CPU 244 initializes a variable n that represents the sequential number of the storage site of the cartridge 410 to be 1. The CPU 244 subsequently moves to step S220.

At step S220, the CPU 244 searches for the storage site that is n-th closest to the label printer 100 that outputs the above described "remaining amount small information" acquired at the above described step S210, on the basis of the above described latest storage information stored in the above described large-capacity storage device 247 at this time point (see the above described FIG. 8).

At step S225, the CPU 244 subsequently records presence or absence of the stock of the cartridge 410 corresponding to the label printer 100 that outputs the above described "remaining amount small information" (whether or not the stock is present at any of the storage positions) in, for example, the above described RAM 248, on the basis of the result of the search at the above described step S220. The CPU 244 subsequently moves to step S230.

At step S230, the CPU 244 increments the above described variable n of the cartridge 410 by 1 and, at step S235 performed subsequently, determines whether or not the above described n becomes n=max (whether or not the search for the stock for all the storage sites comes to an end). The determination is not satisfied until n=max is established (S235:NO) and the CPU 244 returns to step S220 and repeats execution of step S220 to step S235. The execution of the above described step S220 to step S235 is repeated incrementing n at step S230 and, thereby, which storage site has the stock of how many cartridges 410 for the label printer 100 that outputs the above described "remaining amount small information" is fully searched. The search result thereof is stored (recorded) in the above described RAM 248.

On the other hand, when n=max is established at the above described step S235, the determination is satisfied (step S235:YES) and the CPU 244 moves to step S240.

At step S240, the CPU 244 determines whether or not the stock of the cartridge 410 corresponding to the label printer 100 that outputs the above described "remaining amount small information" is present in a predetermined quantity (in this example, one) or more at any of the storage sites, as the result of the repetition of the execution of the above described step S220 to step S235. When the quantity of the stocked cartridges 410 is less than the above described predetermined quantity (in this example, when no stock is present), the determination is not satisfied (S240:NO) and the CPU 244 moves to step S245. When the quantity of the stocked cartridges 410 is equal to or larger than the above described predetermined quantity (in this example, when at least one cartridge 410 as the stock is present), the determination is satisfied (S240:YES) and the CPU 244 moves to step S255.

At step S255, the CPU 244 outputs a display control signal to the displaying part 103 of the label printer 100 that outputs the above described "remaining amount small information", to display the above described storage site storing therein the cartridges 410 corresponding to the label printer 100 (that is, the storage position of the cartridges 410) in order of increasing distance from the corresponding label printer 100. An example of the display on the displaying part 103 at this time is shown in FIG. 12.

In FIG. 12, in this example, on the above described displaying part 103, a message "the stock is present at the site below" representing that the stock of the cartridge 410 of the "type A" corresponding to the above described label printer 100 is present is displayed. The first-floor repository closest to the above described label printer 100 is displayed as the first candidate in a space under the message, and the third-floor repository next closest thereto is displayed as the second candidate in a space further under the display of the first candidate (similarly descried thereafter). In this example, the number of stocked cartridge 410 of each of the candidates (one in the first-floor repository, three in the third-floor repository) is also displayed together with the above. In addition to displaying the storage site close to the label printer 100 in a space higher than that for the storage site far therefrom as described above, no problem arises when the storage site close to the label printer 100 is displayed to be more prioritized in some manner such as the case that the storage site close to the label printer 100 is displayed to be more conspicuous than that for the storage site far therefrom.

When step S255 is completed as described above, the CPU 244 moves to step S260 described later.

On the other hand, at step S245 to which the CPU 244 moves because the determination at step S240 is not satisfied, the CPU 244 sets the above described flag F representing the exhaustion of the stock of the cartridge 410 to be "1". The CPU 244 subsequently moves to step S250.

At step S250, the CPU 244 records the cartridge 410 corresponding to the label printer 100 that outputs the above described "remaining amount small information" as the cartridge 410 whose stock is exhausted (updates the information stored in the above described large-capacity storage device 247). The CPU 244 subsequently moves to step S260.

At step S260, the CPU 244 determines whether or not the processes at the above described step S210 to step S255 (or step S250) come to an end for all the label printers 100 connected to the management server 200 at this time point. In the case that the processes do not yet come to an end for all the label printers 100, the determination at step S260 is not satisfied (S260:NO) and the CPU 244 returns to step S210 and repeats the same steps. When the processes come to an end for all the label printers 100, the determination at step S260 is satisfied (S260:YES) and the CPU 244 causes this routine to come to an end and moves to step S120 in the above described FIG. 10.

Returning back to FIG. 10, at step S120, the CPU 244 determines whether or not the above described flag F is set to be 1. When the flag F remains to be F=0, the determination is not satisfied (S120:NO) and the CPU 244 causes this flow to come to an end. On the other hand, when F is F=1 at step S245, the determination is satisfied (S120:YES) and the CPU 244 moves to step S125.

At step S125, the CPU 244 performs an operating printer calculation process for determining the number of label printers 100 in their operating state.

Detailed steps of the above described step S125 are shown in FIG. 13. In FIG. 13, at step S305, the CPU 244 first initializes a variable m that represents the sequential number of the label printer 100. The CPU 244 subsequently moves to step S310.

At step S310, the CPU 244 acquires the history of the above described "system error information" (see step S90 in the above described FIG. 9) that is output from the above described m-th label printer 100 of all the label printers 100 connected to the management server 200, from the above described log stored in the above described large-capacity storage device 247.

At step S315, the CPU 244 subsequently determines whether or not the frequency of the system error acquired at the above described step S310 is equal to or higher than a threshold value (such as, for example, once in one to three month(s)). Whether or not the normal operating state of the label printer 100 is maintained is determined using the frequency of the system error, When the frequency is equal to or higher than the above described threshold value, the determination at step S315 is satisfied (S315:YES) and the CPU 244 moves to step S335 described later. When the frequency is lower than the above described threshold value, the determination at step S315 is not satisfied (S315:NO) and the CPU 244 moves to step S320.

At step S320, the CPU 244 acquires the history of the above described most recent "label production completion information" (see step S60 in the above described FIG. 9) that is output from the above described m-th label printer 100 of all the label printers 100 connected to the management server 200, from the above described log stored in the above described large-capacity storage device 247.

At step S325, the CPU 244 subsequently determines whether or not the history of the label production completion information acquired at the above described step S320 is in a predetermined term (such as, for example, in approximately one month). When the history is in the outside of the predetermined term, the determination at step S325 is not satisfied (S325:NO) and the CPU 244 moves to step S335 described later. When the history is in the predetermined term, the determination at step S325 is satisfied (S325:YES) and the CPU 244 moves to step S330.

At step S330, the CPU 244 counts the m-th label printer 100 as a label printer 100 in the operating state. The CPU 244 subsequently moves to step S335.

At step S335, the CPU 244 determines whether or not the above described m becomes m=max (whether or not the process comes to an end for each of all the label printers 100). The determination is not satisfied until m=max is established (S335:NO) and the CPU 244 moves to step S340. At step S340, the CPU 244 increments the above described variable m of the label printer 100 by 1, returns to the above described step S310, and repeats the same steps.

As described above, the CPU 244 repeats the above described step S310 to step S340 incrementing m at step S340 and, when the process comes to an end for each of all the label printers 100 and m=max is established, the determination at step S335 is satisfied (S335:YES) and the CPU 244 moves to step S130 in the above described FIG. 10.

Returning back to FIG. 10, at step S130, the CPU 244 sums up all the types of the cartridge 410 (see step S250 in the above described FIG. 11) whose stock is exhausted on the basis of the result of the stock determination process at the above described step S115, and writes the result thereof in a predetermined order list. The CPU 244 subsequently moves to step S135.

At step S135, the CPU 244 determines the number to be ordered of the cartridge 410 whose stock is exhausted, that is written at the above described step S130, on the basis of the total number of the label printers 100 counted to each be in the operating state at step S330 in the above described FIG. 13 (the above descried number to be ordered is determined to be a large number when the above described total number is a large number, and the above descried number to be ordered is determined to be a small number when the above described total number is a small number) and writes the number to be ordered in the above described order list together therewith.

An example of this order list is shown in FIG. 14. In this example shown in FIG. 14, 80 cartridges 410 of the "type C", 80 cartridges 410 of the "type E", (those after these are not described herein), and the like are written as the cartridges 410 to be ordered. When the above described step S135 comes to an end, the CPU 244 moves to step S140.

At step S140, the CPU 244 transmits the order list that has the types of the cartridges 410 summed up at above described step S130 and the number to be ordered of the cartridges 410 determined at the above described step S135 written therein such as that shown in the above described FIG. 14, to the above described manufacturer server 10 through the network NW. The CPU 244 subsequently causes this flow to come to an end.

<Advantages of Embodiment>

As described above, in this embodiment, during the use of the label printer 100 by the user, in the case that the number of the cartridge 410 becomes small (or is exhausted), the user can easily recognize at which position the same type of cartridge 410 is stored as the stock, using the display on the displaying part 103 of the label printer 100 (see FIG. 12) (see step S255 in FIG. 11). As a result, the user can go to the storage position, reliably acquire the cartridge 410, and attach the cartridge 410 to the label printer 100. The time and effort of the user can therefore be saved, and the convenience can be improved.

In this embodiment, especially, in the case that plural stock positions for the cartridges 410 are present, the stock position closest to the corresponding label printer 100 is displayed being mote prioritized than the other stock positions (see FIG. 12). The user can thereby easily learn the stock position that is closest to the used label printer 100, of the stock positions of the cartridges 410 present at the plural points, and the convenience is therefore further improved.

In this embodiment, especially, in the case that the number of the cartridges 410 as the stock is smaller than a predetermined value, an order process for the cartridges 410 is performed (see step S130 and step S140 of FIG. 10). In the case that the number of the cartridges 410 as the remaining stock becomes small to some extent due to the exhaustion by the use, ordering of the cartridges 410 can thereby be automatically performed on the basis of the ordering steps.

In this embodiment, especially, the quantity of the cartridges 410 to be ordered is increased or reduced in accordance with the number of the label printers 100 in their operating state (see step S135 in FIG. 10). Even in the case that the number of label printers 100 in their actual operating state is varied due to the degradation over time, purchasing new printers, or the like, an order can thereby be placed for the proper number of cartridges 410 corresponding to the variation. As a result, such situations can be avoided as that an order for an excessive number of cartridges 410 is carelessly placed and the cartridges 410 are excessive for a long time, and that the cartridges 410 are lacked for the newly purchased label printers and some of the label printers 100 are difficult to operate. In the case that the user changes some of the label printers 100 to new model label printers 100 associated with a change of the model, or the like, the number of the cartridges 410 to be ordered can also be easily kept to be a proper value.

In this embodiment, especially, the number of the label printers 100 in their operating state is determined on the basis of the "system error information" corresponding to occurrence of system errors of each of the label printers 100, or the "label production completion information" corresponding to the completion of the production of each of the print labels L of each of the label printers 100, and the quantity of the cartridges 410 to be ordered is increased or reduced on the basis of the result of the determination (see step S135 in FIG. 10). For example, assuming that, for the label printer 100 for which the "label production completion information" is relatively recently issued, the normal operating state thereof is thereby maintained and assuming that, for the label printer 100 having system errors occurring therein at a certain frequency, this label printer 100 is not in its normal operating state, the above can thereby be reflected on the number of the cartridges 410 to be ordered.

In this embodiment, especially, examples of the above described system error include at least one of operation malfunctioning caused by the above described printing head 419 and communication malfunctioning with the above described cartridge memory 450 caused by the above described antenna 449. It can thereby be assumed that a system error occurs in the case that any operation malfunctioning occurs in the printing head 419 or in the case that any communication malfunctioning (in an unrecoverable state) occurs between the antenna 449 and the cartridge memory 450 included in the cartridge 410.

The present disclosure is not limited to the above described embodiment and various modifications can be made thereto within the scope not departing from the gist and the technical idea thereof. Such modification examples will sequentially be described below. Portions equivalent to those in the embodiment are given the same reference numerals and will properly not be described or will simply be described.

(1) Case that Stock Position of Cartridges is Printed Using Label

Instead of displaying information indicating at which position the cartridge 410 is stored as the stock, on the displaying part 103 of the label printer 100 in the above described embodiment, the above described content is formed as a print on the print label L in this modification example, Detailed steps of the stock determination process at the above described step S115 of the control steps performed by the CPU 244 of the above described management server 200 in this modification example are shown in FIG. 15.

In the flow shown in FIG. 15, step S255' is provided instead of step S255 in the flow in FIG. 11 of the above described embodiment. At step S255', the above described CPU 244 outputs a printing control signal to the label printer 100 that already outputs the above described "remaining amount small information", forms as a print the above described storage site storing therein the cartridge 410 corresponding to the label printer 100 (that is, the stock position of this cartridge 410) using the printing head 419 of the label printer 100 on the cover film 411, to produce the print label L.

An example of this print label L is shown in FIG. 16. In FIG. 16, in this example, an indication "Type A" representing that the stock of the cartridge 410 of the "type A" corresponding to the above described label printer 100 is present is formed as a print. Under this, "IF" representing the first-floor repository that is closest to the above described label printer 100 is formed as a print as the first candidate and, on the right side thereof, "3F" representing the third-floor repository that is next closest thereto is formed as a print as the second candidate (similarly described thereafter). In this example, the stock quantity for each of the candidates (a text "1" representing that one cartridge 410 as the stock is present in the first-floor repository, a text "2" representing that two cartridges 410 as the stock are present in the third-floor repository) is also formed as a print together with the above items. In addition to printing the storage site close to the label printer 100 ahead (in this example, on the left side) of the storage site far therefrom as described above, no problem arises when the storage site close to the label printer 100 is printed to be more prioritized than the storage site far therefrom in some manner such as printing the one close to the label printer 100 to be more conspicuous than the one far therefrom.

In this modification example, during the use of the label printer 100 by a user, in the case that the tape remaining amount of the attached cartridge 410 becomes small (or is exhausted), the user can easily recognize at which position the same type of cartridge 410 is stored as the stock, using the indication on the print label L produced by the label printer 100 currently in use. As a result, similar to the above described embodiment, the user can go to the storage position, reliably acquire the cartridge 410, and attach the cartridge 410 to the label printer 100. The time and effort of the user can therefore be saved, and the convenience can be improved.

(2) Others

The method of performing the printing for the cover film 411 other than the base tape 416 and bonding these to each other is employed in the above while the method is not limited to this and the present disclosure may be applied to a method of performing the printing for a print-receiving tape layer included in the base tape (a type without performing any bonding).

The above has been described taking the example of the case that the print-receiving tape roll having the print-receiving medium (in the above described example, the cover film 411) wound therein and the base tape roll having the base tape 416 wound therein are arranged in the cartridge 410 and the print-receiving medium is fed out from the above described print-receiving tape roll and is used while the configuration is not limited to this. For example, the case that a cartridge having another shape that includes only the print-receiving tape roll (the consumables in this case) is provided, and the configuration for a roll having the above described print-receiving medium wound therein to be directly mounted to attach and detach on the side of the label printer, can also be considered. The same advantage is also achieved in each of these cases.

The above has been described taking the example of the case that the present disclosure is applied to the print label producing apparatus that produces a print label by performing desired printing for the print-receiving medium while the printing device is not limited to this. The present disclosure may be applied to, for example, a printer that forms an image and prints characters on a regular print-receiving paper sheet having a size such as A4, A3, B4, or B5, or a handheld printer that is driven by a battery power source, as an example of the printing device. The same advantage is also achieved in each of these cases.

The arrows shown in the drawings such as FIGS. 4 and 5 in the above each indicate an example of the flow of a signal and do not limit any flow direction of any signal.

The flowcharts shown in FIGS. 9, 10, 11, 8, 15, and the like do not limit the present disclosure to the steps shown in the above described flows and any addition, any deletion, any change of the order, or the like of the steps may be made within the scope not departing from the gist and the technical idea of the present disclosure.

In addition to what has already been described, the methods by the above described embodiment and the modification examples may properly be combined with each other to be used.

What is claimed is:

1. A non-transitory computer-readable recording medium storing a consumables management program to be readable by a CPU of a management server for executing steps on said CPU, said management server being configured to be connected to a plurality of label producing apparatuses each configured to produce a print label and comprising a memory that stores latest information related to a plurality of stock positions and a stock quantity of consumables for the plurality of label producing apparatuses, said steps comprising:

a first information acquisition step for acquiring consumption information by said CPU, the consumption information being related to said consumables in each of the label producing apparatuses, from each of the label producing apparatuses;

a stock detection step for detecting said stock position and said stock quantity of said consumables by said CPU, the consumables being corresponding to said consumption information acquired in said first information acquisition step, on the basis of the latest information stored in said memory;

a search step for searching by said CPU one stock position among said plurality of stock positions that corresponds to said consumables for said label producing apparatus from which the consumption information is acquired, on the basis of a result of a detection in said stock detection step, said one stock position being closest to the corresponding label producing apparatus; and a display control step for outputting a display control signal by said CPU, the display control signal causing a display device included in the label producing apparatus to display said one stock position that is closest to the corresponding label producing apparatus, on the basis of a result of a search in said search step.

2. The recording medium according to claim 1, wherein in said display control step, said CPU outputs said display control signal to display said one stock position that is closest to the corresponding label producing apparatus to be displayed being more prioritized than the other stock positions.

3. The recording medium according to claim 2, wherein in said display control step, said CPU outputs said display control signal to display said one stock position that is closest to the corresponding label producing apparatus to be displayed in a portion more upward on said display device than a portion for the other stock positions.

4. A non-transitory computer-readable recording medium storing a consumables management program to be readable by a CPU of a management server for executing steps on said CPU, said management server being configured to be connected to a plurality of label producing apparatuses each configured to produce a print label and comprising a memory that stores latest information related to at least one stock position and a stock quantity of consumables for the plurality of label producing apparatuses, said steps comprising:

a first information acquisition step for acquiring consumption information by said CPU, the consumption information being related to said consumables in each of the label producing apparatuses, from each of the label producing apparatuses;

a stock detection step for detecting said stock position and said stock quantity of said consumables by said CPU, the consumables being corresponding to said consumption information acquired in said first information acquisition step, on the basis of the latest information stored in said memory; and a display control step for outputting a display control signal by said CPU, the display control signal causing a display device included in the label producing apparatus from which the consumption information is acquired to display said stock position that corresponds to said consumables for said label producing apparatus, on the basis of a result of a detection in said stock detection step, wherein said consumables management program further causes said CPU to execute:

a stock determination step for determining by said CPU whether or not said stock quantity of said consumables corresponding to said consumption information acquired in said first information acquisition step is equal to or larger than a predetermined value;

said display control step in the case that it is determined in said stock determination step that said stock quantity is equal to or larger than said predetermined value, or an ordering step for performing an ordering process of the consumables by said CPU in the case that it is determined in said stock determination step that said stock quantity is smaller than said predetermined value, wherein in said ordering step, said CPU increases or decreases a quantity of said consumables to be ordered in accordance with number of said label producing apparatuses each in an operating state, wherein said consumables management program further causes said CPU to execute:

a second information acquisition step for acquiring system error information by said CPU, the system error information corresponding to occurrence of a system error of each of the label producing apparatuses; and a first operation determination step for determining the number of said label producing apparatuses being in the operating state by said CPU, on the basis of said system error information acquired in said second information acquisition step, and wherein in said ordering step, said CPU increases or decreases the quantity of said consumables to be ordered in accordance with the number of said label producing apparatuses that is determined to be in the operating state in said first operation determination step.

5. A non-transitory computer-readable recording medium storing a consumables management program to be readable by a CPU of a management server for executing steps on said CPU, said management server being configured to be connected to a plurality of label producing apparatuses each configured to produce a print label and comprising a memory that stores latest information related to at least one stock position and a stock quantity of consumables for the plurality of label producing apparatuses, said steps comprising:

a first information acquisition step for acquiring consumption information by said CPU, the consumption information being related to said consumables in each of the label producing apparatuses, from each of the label producing apparatuses;

a stock detection step for detecting said stock position and said stock quantity of said consumables by said CPU, the consumables being corresponding to said consumption information acquired in said first information acquisition step, on the basis of the latest information stored in said memory; and a display control step for outputting a display control signal by said CPU, the display control signal causing a display device included in the label producing apparatus from which the consumption information is acquired to display said stock position that corresponds to said consumables for said label producing apparatus, on the basis of a result of a detection in said stock detection step, wherein said consumables management program further causes said CPU to execute:

a stock determination step for determining by said CPU whether or not said stock quantity of said consumables corresponding to said consumption information acquired in said first information acquisition step is equal to or larger than a predetermined value;

said display control step in the case that it is determined in said stock determination step that said stock quantity is equal to or larger than said predetermined value, or an ordering step for performing an ordering process of the consumables by said CPU in the case that it is determined in said stock determination step that said stock quantity is smaller than said predetermined value, wherein in said ordering step, said CPU increases or decreases a quantity of said consumables to be ordered in accordance with number of said label producing apparatuses each in an operating state, wherein said consumables management program further causes said CPU to execute:

a third information acquisition step for acquiring label production completion information by said CPU, the label production completion information corresponding to completion of production of said print label in each of the label producing apparatuses; and a second operation determination step for determining the number of said label producing apparatuses being in the operating state by said CPU, on the basis of said label production completion information acquired in said third information acquisition step, and wherein in said ordering step, said CPU increases or decreases the quantity of said consumables to be ordered in accordance with the number of said label producing apparatuses that is determined to be in the operating state in said second operation determination step.

6. The recording medium according to claim 4, wherein said label producing apparatus comprises a printing head, and wherein said system error is an operation malfunctioning of said printing head.

7. The recording medium according to claim 4, wherein said label producing apparatus comprises a communication device, wherein said consumables includes a consumables memory, and wherein said system error is a communication malfunctioning of said communication device to said consumables memory.

8. The recording medium according to claim 1, wherein said label producing apparatus comprises a printing head, and wherein said consumables management program further causes said CPU to execute a printing control step for outputting a printing control signal by said CPU to cause said printing head to print said stock position corresponding to said consumables for said label producing apparatus from which the consumption information is acquired on a print-receiving medium on the basis of a result of the detection in said stock detection step.

9. The recording medium according to claim 8, wherein in said printing control step, said CPU outputs said printing control signal to print said one stock position that is closest to the corresponding label producing apparatus to be printed being more prioritized than said other stock positions.

* * * * *

UNITED STATES PATENT AND TRADEMARK OFFICE
CERTIFICATE OF CORRECTION

PATENT NO. : 11,010,821 B2  
APPLICATION NO. : 16/224916  
DATED : May 18, 2021  
INVENTOR(S) : Alisson De Brito Ninomia Page 1 of 1

It is certified that error appears in the above-identified patent and that said Letters Patent is hereby corrected as shown below:

In the Claims

Column 19, Claim 1, Line 21 should read:
dance with a number of said label producing apparatuses Column 20, Claim 5, Line 18 should read:
dance with a number of said label producing apparatuses Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*